United States Patent [19]
Weber et al.

[11] Patent Number: 4,995,071
[45] Date of Patent: Feb. 19, 1991

[54] VIDEO CONFERENCE INSTALLATION

[75] Inventors: Jens Weber, Bad Soden; Rolf Loos, Muenster, both of Fed. Rep. of Germany

[73] Assignee: Telenorma Telefonbau und Normalzeit GmbH, Fed. Rep. of Germany

[21] Appl. No.: 359,028

[22] Filed: May 30, 1989

[30] Foreign Application Priority Data

Jul. 8, 1988 [DE] Fed. Rep. of Germany ....... 3823219

[51] Int. Cl.$^5$ ............... H04N 7/12; H04N 7/14
[52] U.S. Cl. ..................... 379/53; 379/54; 358/85
[58] Field of Search ............. 379/53, 54; 358/85

[56] References Cited

U.S. PATENT DOCUMENTS

| 4,253,000 | 2/1981 | Kasson | 379/202 |
| 4,516,156 | 5/1985 | Fabris et al. | 379/53 |
| 4,650,929 | 3/1987 | Boerger et al. | 379/54 X |
| 4,893,326 | 1/1990 | Duran et al. | 358/85 |

FOREIGN PATENT DOCUMENTS 0084270 6/1986 European Pat. Off.
0153903 11/1988 European Pat. Off.
2640019 3/1978 Fed. Rep. of Germany.

OTHER PUBLICATIONS

Zukunftssichere Kommunikation mit Integral Von TN, TN-Nachrichten 1986, Heft 89, pp. 3-27.
Nachrichtenvermittlung, Grundsatze und Systemmerkmale bei Fernsprech-und Datennetzen, Hoeckley Oden, pp. 85-90.

Primary Examiner—Jin F. Ng
Assistant Examiner—Stella L. Woo
Attorney, Agent, or Firm—Eckert Seamans Cherin & Mellott

[57] ABSTRACT

A video conference installation has transmission and reception devices for handling audio and video signals from a plurality of subscriber points via a shared processor which assigns individual subscriber units to the subscriber points. A digital communication system connects subscriber telephone sets (F) to the shared processor via subscriber circuits (AL) having two utility channels and a signalling channel. Audio is pulse code modulated for transmission over one utility channel and compressed video is transmitted over the other. Each subscriber point has a video monitor (B) and video camera (K). Control symbols (SS, SY) are displayed on the subscriber's monitor via an overlay generator (OG). The subscriber can initiate control and switching actions by pointing to displayed symbols on the screen using a cursor, light pen or position sensitive screen input.

21 Claims, 4 Drawing Sheets

VIDEO CONFERENCE INSTALLATION

BACKGROUND OF THE INVENTION

1. Field of the Invention.

The invention concerns a video conference installation for a plurality of subscriber points, with each subscriber point having transmission and reception arrangements for audio signals (e.g., an electroacoustic converter) and image signals (e.g., television camera and video monitor). The subscriber points have access to a shared processing installation which is used to transmit the audio and video signals arriving from the subscriber points. The processing installation has individual subscriber units, each of which is permanently assigned at the beginning of the conference to any desired subscriber point participating in the conference, for the duration of the subscriber conference, and each individual subscriber unit is equipped with image memories with reading and writing devices which make the camera video signals of a full frame completely available, and multiplexers. The apparatus allows optional access to the video signals of all the cameras. The apparatus processes the audio and video signals to be transmitted to the individual subscriber points on the basis of control signals from these subscriber points in the individual subscriber units.

2. Prior Art.

A video conference installation of this general kind is already known. EP-OS No. 0 153 903 describes an information system for visual conferences which has a central visual conference unit equipped with image memories that performs the switching function between the sending and receiving devices for the audio and image signals. The technically relatively complex installations needed for this switching function, and for preparing the individual video signals to form individually constituted mixed images for all of the transmitting and receiving installations that can be connected, is required only in the central video conference unit and therefore exclusively in the context of the actual video conference traffic. Utilization of the central video conference unit makes it possible to implement video conferences along the lines of studio conferences as only one point-to-point connection at a time having bidirectional channels, with sufficient bandwidth for transferring video, audio and signalling information, being required. A conference director for video direction then becomes completely unnecessary, since direction can be performed individually at any time in the context of several predefined possible variations from each location, according to the party's own parameters and desires, with no repercussions on the other transmitting and receiving arrangements. A disadvantage of this known information system for video conferences is the provision of microphones, loudspeakers and special equipment with the selection, audio direction and video direction operating elements.

SUMMARY OF THE INVENTION.

An object of the invention is to configure the known information system for video conferences in such a way that besides the arrangements for sending and receiving video signals, no special additional equipment, such as a device with audio and video direction operating elements, is needed.

This object is achieved by the fact that the joint processing installation is connected through a bundle of connector cables to a digital telecommunications system, especially a telephone exchange system, to which a plurality of telephones are each connected through a subscriber circuit. Two identical utility channels and one signalling channel are available for transmissions in both directions over each of the subscriber circuits. In the case of a conference connection, the audio signals from or to the telephone set are transmitted in the form of pulse-code modulated words on the one utility channel, while the compressed video signals from the television camera or the compressed video signals for the video monitor are transmitted over the other utility channel. Associated with each subscriber point is an input keyboard and/or a light pen and/or a digital position transmitter with a control key to control a cursor on the video monitor screen, such that it is possible by means of selections using symbols displayed on the screen to control functions with the aid of the input keyboard or cursor or light pen. The data used to represent the symbols on the screen is generated by an overlay generator in the individual subscriber units and added to the video signals, while the control and positioning signals from the subscriber point, which are transferred over the signaling channel, are processed in a control installation in each individual subscriber unit, and are used to initiate control and switching actions with regard to audio and/or video signals (video and audio direction) for the subscriber point in question.

The video conference installation according to the invention can therefore be used in an ISDN-capable telephone exchange system, with both the audio signals and the video signals being transferred over a 64 kbit/second channel. The cursor on the video monitor screen can be controlled either by means of an alphanumeric entry keyboard on the telephone set or by means of a "mouse" or a light pen. No other additional equipment is required at the subscriber point. The handset of the telephone set, or possibly a speakerphone device, is sufficient for reception and reproduction of speech. Since, according to the connection structure, the signalling channel is transparent to the transfer of the audio and video control signals, even participants who are connected at other switching points can participate in conferences, since they also have access to the shared installation, which is connected through a bundle of connector cables to the switching point, over a subscriber line which interconnects the switching points. Image compression processes used to transfer television video signals using suitable 64 kbit/second codecs are already known. For example, a process of this kind is described in European Patent No. 0 084 270.

Additional advantages are evident from the disclosure and claims.

The invention will be explained in more detail with reference to an exemplary embodiment illustrated in the drawing in which:

DETAILED DESCRIPTION OF THE PREFERRED EMBODIMENTS.

Figure 1:
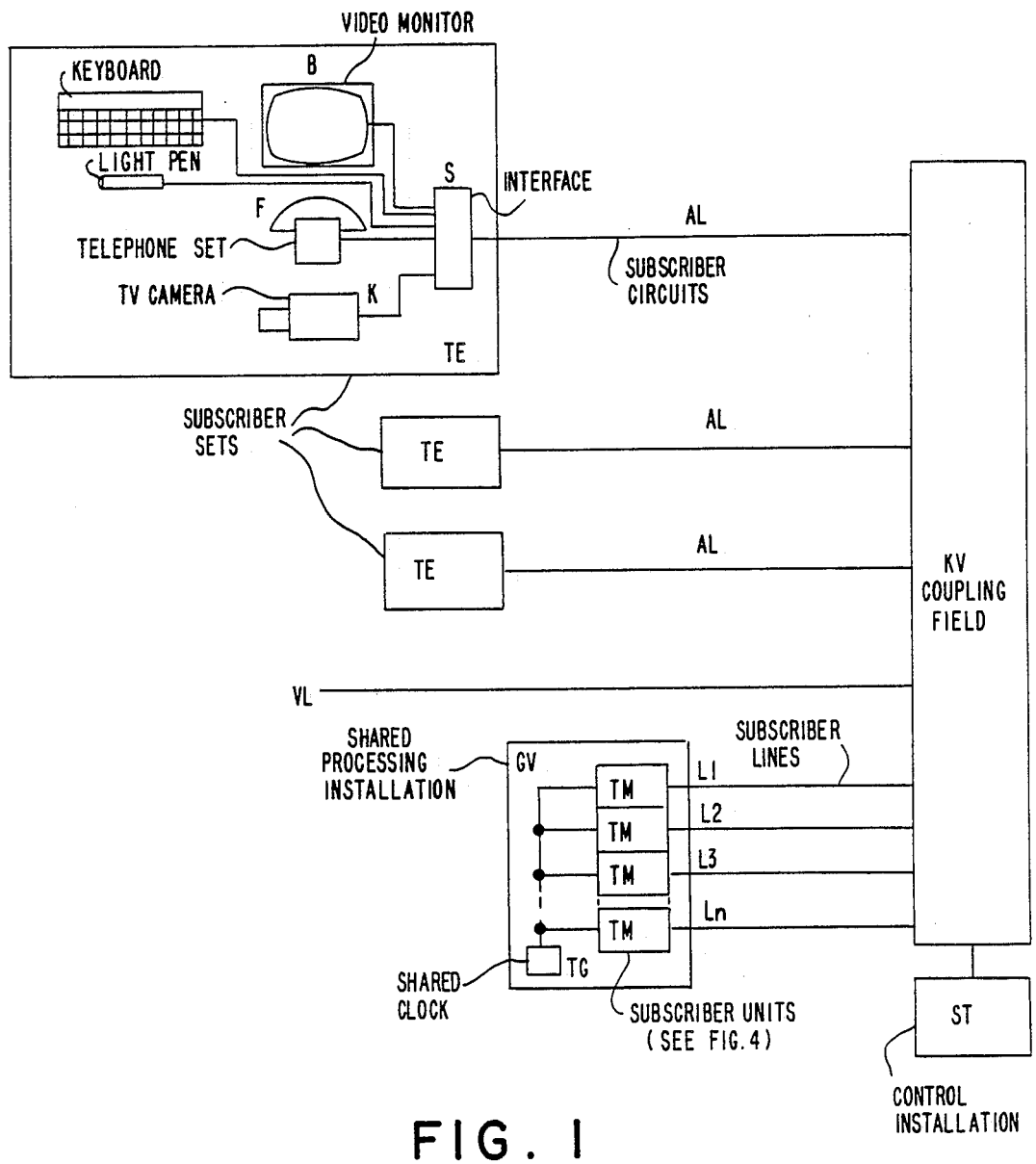
FIG. 1 is the block diagram of a telecommunications switching system.

The block diagram of a telecommunications switching system presented in FIG. 1 shows only the equipment that is absolutely necessary to an understanding of the invention. Digital telecommunications switching systems in which two utility channels and one signalling channel are bidirectionally transmitted on the connector cables AL are described, for example, in the journal TN-Nachrichten 89, 3–18 (1986). Connected to the coupling field KV of the telecommunications switching system are subscriber sets (TE) (via subscriber circuits AL), telecommunications switching systems (via connector cables VL) and one or more shared processing installations GV (through subscriber lines L). Two utility channels of 64 kbits/second each and one signalling channel of 16 kbits/second are transferred in each direction, at least over the subscriber circuits AL and the subscriber lines L. This can also be true for the connector cable VL. It is also possible, however, to transfer a plurality of audio and signalling channels in both directions through the connector cable VL or to provide several connector cables VL. In the coupling field KV, connections are created among the subscriber circuits AL, or also between these and the connector cable(s) VL and subscriber lines L, with the two utility channels being switched through, and the data on the signalling channel being delivered to the control installation ST which controls the coupling field KV, or the signalling data being generated in the latter installation and delivered via the signalling channel to the subscriber circuits AL, or to the connector cables VL or the subscriber lines L. While data transfer within the utility channels is transparent, transfer of switching data over the signalling channels occurs on the basis of a prescribed model, at least in the connection and disconnection phases (see TN-Nachrichten 89, 6–9 (1986)).

It will be assumed that a subscriber point is equipped with at least a telephone set F, a television camera K, and a video monitor B, with all of these devices being connected through an interface circuit S to the subscriber circuit AL. The telephone set F can be configured, for example, as a "multifunction terminal" (see TN-Nachrichten 89, 19–27 (1986)).

The shared processing installation GV has a series of individual subscriber units TM, each of which is connected via a subscriber line L to the telecommunications switching system. Another possibility, instead of the individual subscriber lines L, is a shared subscriber line through which a plurality of audio and signalling channels are transmitted. All of the individual subscriber units TM, which are modular and can be added to the shared processing installation GV in any desired number, receive timing pulses from a shared clock TG.

In order to participate in a video conference, the subscriber in question lifts the handset, or presses the on-hook dialing key, and dials an identification number that characterizes participation in a conference. This one- or multi-digit identification number is received and evaluated in the control device ST, after which the respective subscriber circuit AL is permanently connected within the coupling field KV, through the respective subscriber circuit AL, to a free individual subscriber unit TM in the shared processing installation GV, for the duration of the conference participation. If several shared processing installations GV are present, meaning that several video conferences can take place simultaneously, the subscriber in question must dial additional numbers characterizing a particular shared processing installation GV with which the respective subscriber point is to be connected. As an administrative measure it is possible to define beforehand, in the context of planning the video conference, which shared processing installation GV will be used, so that those subscribers who wish to participate in a particular video conference can also be interconnected. The indication as to the conference that will take place can be provided to the subscriber beforehand, for example on the screen of the video monitor B, with the information created, for example, in the control device ST of the telecommunications switching system on the basis of corresponding input data, and transferred over the signalling channel. The conference can also be noted on a preparatory basis in the control device ST along with identification of the participating subscriber points, eliminating the need to dial the additional number if, because those subscriber points that have dialed the identification number have been identified, the participants designated for the conference have been connected to the corresponding shared processing installation GV. The connection can also be automatically created, in the context of the conference, by the control device ST at an agreed-upon time; it is also possible to initiate a conference through a subscriber point, at which time all the other subscriber points participating in the conference are connected with the shared processing installation GV on the initiative of the control device ST, if the corresponding preparations have been made. Other possibilities for calling, entering and exiting from a conference are discussed in Oden, *Information routing*, Oldenbourg-Verlag, Munich, Vienna, 1975, pp. 86–90.

Figure 2:
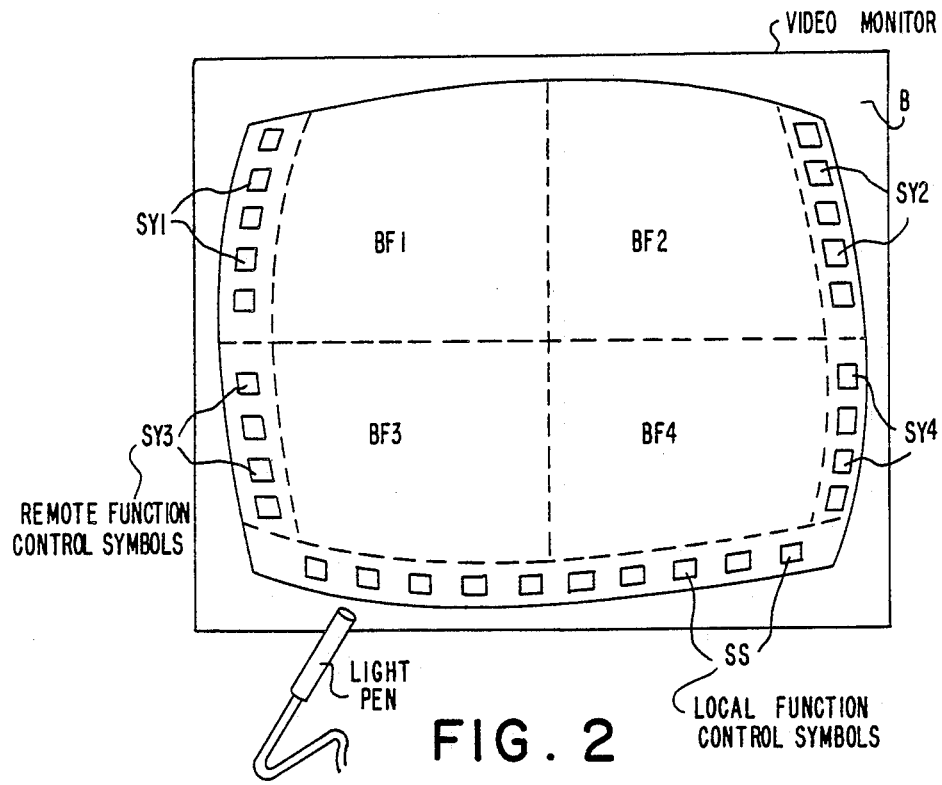
FIG. 2 is the representation diagram on the screen.

The screen shown in FIG. 2 can be the screen of a video monitor B or a data terminal or a liquid crystal display. Displayed at the bottom edge of the screen are symbols SS which are used for function control purposes (video and audio direction) with respect to the respective subscriber point, while the lateral edges display symbols SY1 to SY4 which concern functional control of the audio and video signals of the other subscriber points participating in the video conference, in terms of reproduction at the respective subscriber point. The video information acquired by the television cameras of the other subscriber points participating in the conference is represented on screen segments BF1 through BF4; this can be video imagery or portraits of the participants, or documents. It is also possible, instead of imaging more than one participant, to represent on the screen only the participant who is speaking at the time, in which case only one group of symbols SY will be needed. The type of presentation can be selected by the respective participant himself. Each of the symbols SS and SY represent the visual representation of a function; for example the symbols SS are used to switch over from representing persons to representing documents (in which case the entire screen surface can generally be utilized with the exception of the required symbols), to focus the local television camera, switch the video monitor B on and off, adjust the brightness, make other adjustments to the screen, and possibly select which speaker will be imaged on the screen if more than four or five persons are participating in the conference. The symbols SY deal with sound volume and balance, and possibly control of the reproduction scale for documents. Each of these symbols can be provided with a counter-symbol which is used to reduce or increase the sound volume signal, for bright-/dark settings, etc.

The functions represented by the symbols can be activated in various ways. It is possible to activate the respective function by manually touching the appropriate symbol (touch screen). A light pen may also be available, the tip of which needs to be placed on the appropriate symbol. Another possibility for function selection is to move an arrow or cursor around the screen. This can be done either with a digital position transmitter (mouse) or by actuating corresponding control keys on an alphanumeric entry keyboard of the multifunction terminal F (see FIG. 1); when the cursor coincides with the position of the appropriate symbol, the control button of the digital position transmitter or the Enter key of the alphanumeric keyboard is then actuated. The symbol presentation method, movement of the cursor, and ways of entering its position will be discussed in more detail later. Note once again that presentation of video data for several persons participating in a video conference has already been described in DE-OS No. 26 40 019.

Information concerning position and control signals is delivered, in the form of corresponding data words, to the terminal subscriber device TE (see FIG. 1) at the interface device S and into the signalling (D) channel, and transferred to the shared processing installation GV.

As already mentioned, the individual subscriber unit TM can be modular in configuration; the shared processing installation GV can be equipped, within certain limits, with any desired number of individual subscriber units TM, with the maximum number of subscriber points participating in a conference limited to the maximum number of individual subscriber units TM in the shared processing installation GV. It should be noted once again that even subscriber points that do not have transmission and reception installations for video signals can participate in the conference. In this case, this information is not sent to the respective subscriber point by the individual subscriber unit, and the subscriber point receives only the corresponding audio signal.

Figure 3:
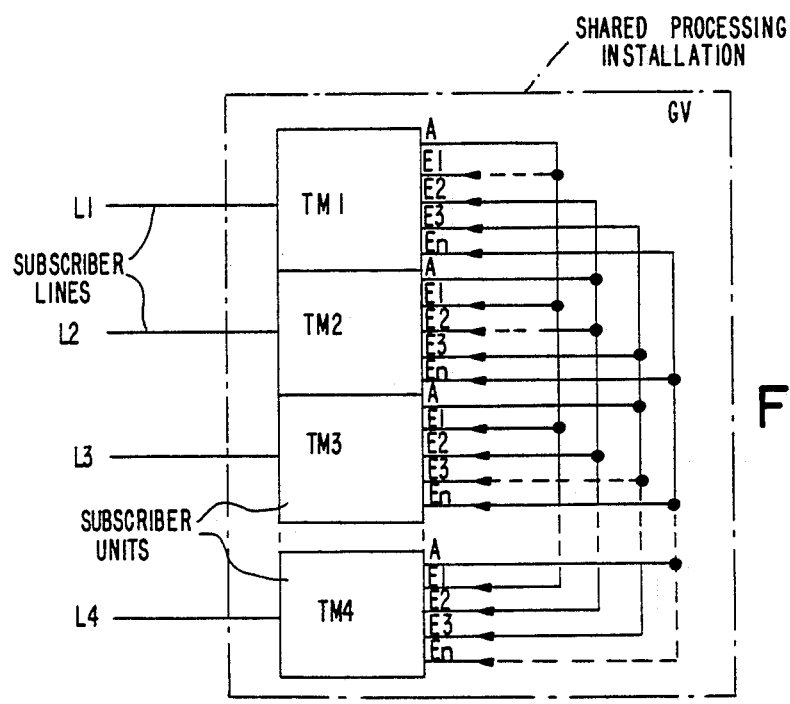
FIG. 3 is the wiring diagram for the individual subscriber units.

The wiring interconnecting the individual subscriber units TM is shown in FIG. 3. Each individual subscriber unit TM has an output A and inputs El to En for both video signals and audio signals. In each case, the output of an individual subscriber unit TM is connected to a certain input E of the local and the other individual subscriber units TM. In the case of the video monitor signals, the output A can also be connected back to the local input E, as shown by the dashed line, while in the case of the audio signals, the local input E always remains unconnected, since on the one hand this can provide the possibility of also presenting on the video monitor the image acquired by the local television camera, while it is known that audio signals from the local connection are not sent back to it in the context of a conference.

Figure 4:
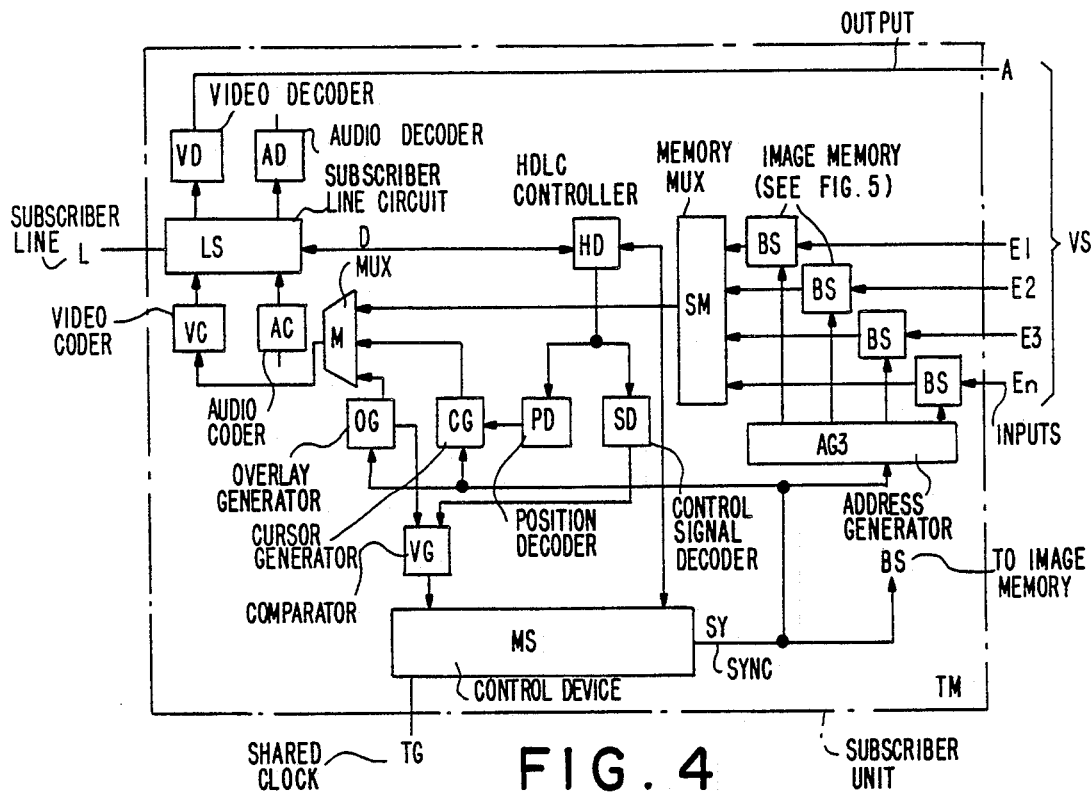
FIG. 4 is the portion of the individual subscriber unit which processes video signals.

Each individual subscriber unit TM (FIG. 4) has as its interface to the subscriber line L a subscriber line circuit LS which distributes the utility and signalling channels arriving over the subscriber line L and combines them for transmission on the subscriber line L. The audio signals of the one utility channel are sent by the subscriber line circuit LS to an audio decoder AD, in which the companded PCM audio signals are converted into linear PCM audio signals. The audio coder AC connected to the subscriber line circuit LS converts the linear PCM audio signals into companded PCM audio signals, which are then transferred on a utility channel over subscriber line L. The video signals, which are transferred on the other utility channel, are sent to a video decoder VD, which converts the compressed video data into linear video data, which are then sent to output A of the individual subscriber unit TM.

The linear video data arriving at the inputs El through En of the other and possibly also the local individual subscriber units TM are each sent to an image memory BS for short-term storage, and then transmitted through a memory multiplexer (MUX) SM to a multiplexer M. The video signals are written to and read from the image memory MS under the control of an address generator AG3 which is controlled by a synchronization signal (SYNC) SY. The structure and operation of the image memory are discussed again later in connection with the description of FIG. 6.

The multiplexer M combines the data to be presented on the screen that has been prepared by the memory multiplexer SM, the overlay generator OG and the cursor generator CG. The output signal of the multiplexer M goes to the video coder VC, which combines the linear video data present at its input into compressed video data for transmission on the other utility channel over subscriber line L. The overlay generator OG and cursor generator CG are also controlled by the synchronization signal SY.

Connected to the subscriber line circuit LS is an HDLC controller HD with accepts the data transmitted over the signalling channel and sends out the data to be transmitted on it. The individual subscriber unit TM has a control device MS which is connected to the HDLC controller. The position information arriving from the subscriber point on the signalling channel is decoded by the position decoder PD and used to define the instantaneous position of the cursor, while the control signal to activate the function identified with the cursor is recognized by the control signal decoder SD. This signal, together with the symbol signal from the overlay generator OG, is sent to a comparator VG; when the two signals correspond, the comparator VG sends a corresponding control signal to the control device MS to activate the selected function.

The control device MS receives the timing signal from the shared clock TG and derives from it the synchronization signal SY. It should be mentioned again that the overlay generator OG can also contain the corresponding display information for a list of function options that can be presented on the screen in writing and can also be activated by positioning the cursor on the desired text and then pressing the control button on the position transmitter or the Enter key on the alphanumeric keyboard.

Figure 5:
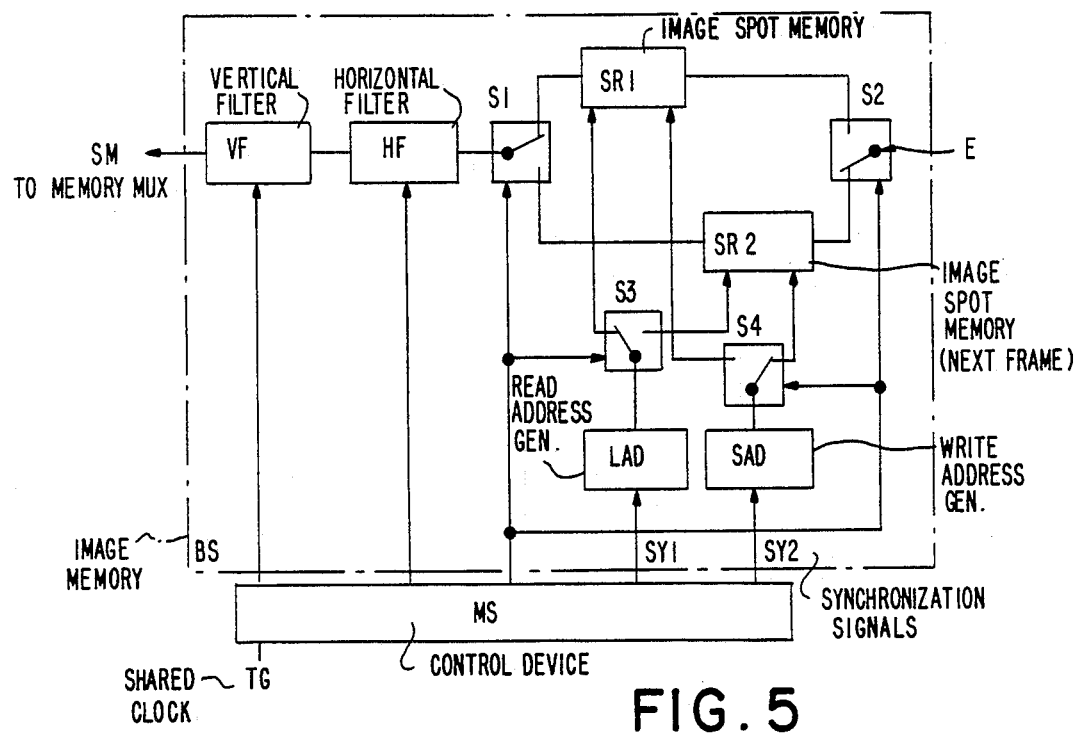
FIG. 5 is the block diagram for processing symbol and control data in the individual subscriber units.

The video signal arriving at input E, sent from the local individual subscriber unit TM or another unit (FIG. 5), is loaded into image spot memory SR2, while the video signal for the previous image is read out from image spot memory SR1 and send to the memory multiplexer SM. Information is read out from an image spot memory SR by the read address generator LAD, while a video signal is written into the image spot memory SR by the write address generator SAD. Switching means represented symbolically by switches S1 to S4 are used to switch the image spot memories SR between writing and reading and to connect the image spot memories SR to either the read address generator or the write address generator. The switches are controlled by the control device MS of the individual subscriber unit TM, which switches over when it receives the odd or even numbers of the sequential images. The read address generator LAD and write address generator SAD are controlled by the synchronization signals SY1 and SY2, which have the same frequency for every device in all the individual subscriber units TM of one shared processing installation GV, guaranteeing that all the video signals are synchronized.

The video signal read out from the image spot memory SR is sent to a horizontal filter HF and a vertical filter VF before being sent on to the memory multiplexer SM. These two filters HF and VF are controlled by the control device MS and are used to interpolate the image in accordance with the reproduction scale. The reproduction scale, like the image position, can be controlled from the subscriber point. As already described, the control signals for the two filters HF and VF are activated by selecting symbols on the screen, as will be described in more detail below.

Figure 6:
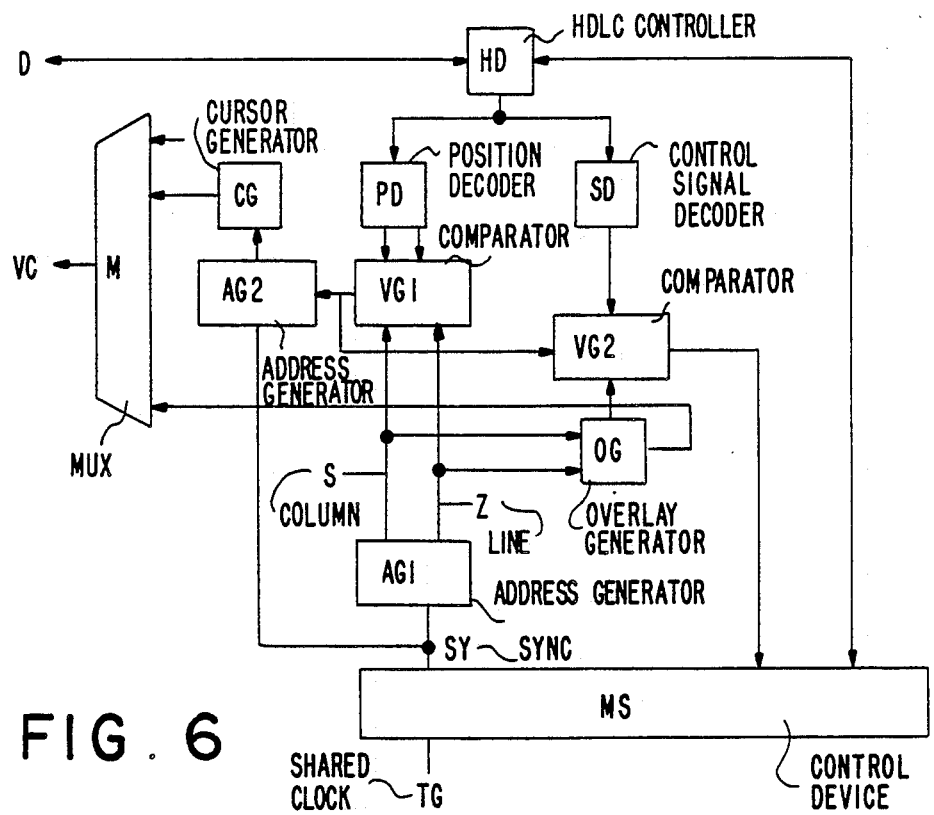
FIG. 6 is the structure of an image memory for the individual subscriber unit.

FIG. 6 shows the devices used to generate the symbols and activate the functions which they represent. As already described, the cursor position together with the control or input signal is transmitted over the signalling channel to the shared processing installation GV and sent on to the respective HDLC controller HD, to which the position decoder PD and control signal decoder SD are connected. The position decoder PD produces at its output the column and line information for the current position of the position transmitter, while the control signal decoder SD generates an output signal when the selected function is selected (for example, when the control button of the position transmitter is actuated).

The address generator AG1 continuously generates the addresses of all columns S and lines Z, which are sent both to the comparator VG1 and to the overlay generator OG. The overlay generator OG generates, in familiar fashion, the video data for the symbols to be represented on the screen. In the comparator VG1, the position of the position transmitter, which is present at the output of the position decoder PD, is compared with the current column and line address; when these two coincide, the comparator VG1 generates a signal which releases the address generator AG2 so that the cursor generator CG can be triggered, after which the image information for the cursor reaches the screen. If the control button of the position transmitter at the subscriber point is then actuated, the control signal reaches the control signal decoder SD which then sends a corresponding signal to the comparator VG2. Since the latter is also receiving the comparison signal from the comparator VG1 and the corresponding signal from the overlay generator OG, the comparator VG2 generates a control signal for the control device MS which identifies the function that has been selected. This control signal is therefore effective only when the current position of the sweep on the screen coincides with the position of the position transmitter, while simultaneously the control signal of the position transmitter coincides with the current position of the cursor. Only when these four conditions are met simultaneously does the control device receive the corresponding control signal.

Figure 7:
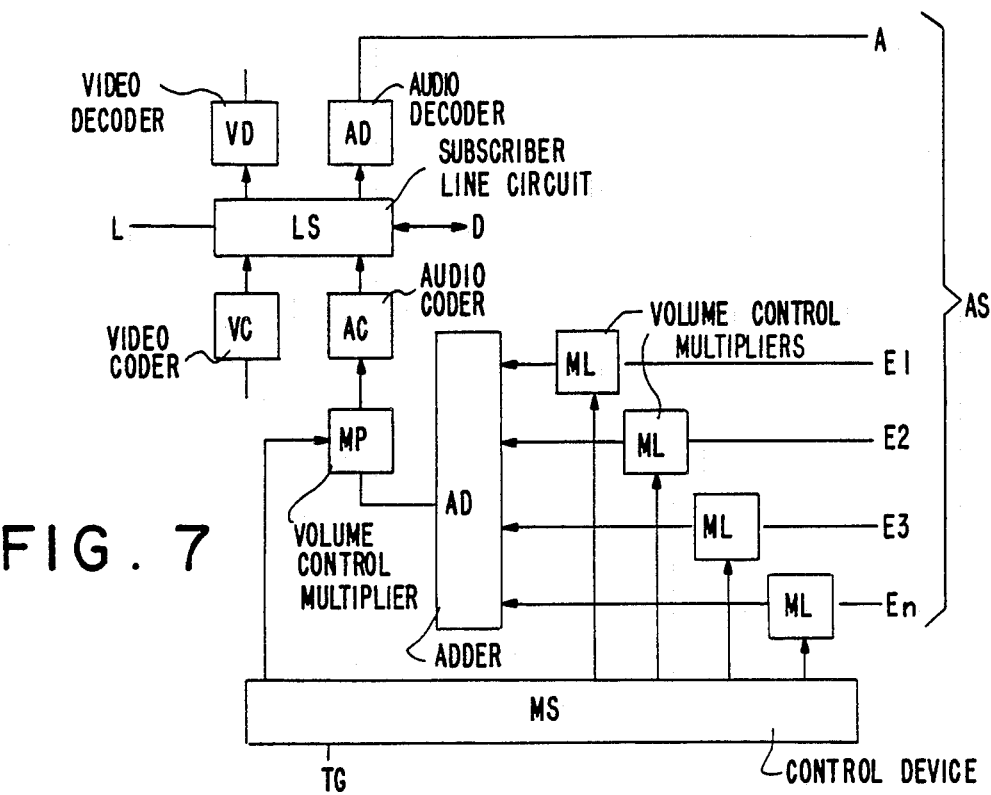
FIG. 7 is the portion of the individual subscriber unit which processes audio signals.

Processing of audio signals in the context of a video conference is explained with reference to the block diagram in FIG. 7. As already mentioned, the audio signals, which have been transmitted in digital form over subscriber line L on the one utility channel, are converted into linear PCM signals in audio decoder AD. These signals then go to output A and thus to the other individual subscriber units TM. The audio signals at the outputs A of the other individual subscriber units TM are sent to inputs El to En. Unlike the situation with the video signals, the individual subscriber units TM do not each receive their own audio signals; it is known that this signal is not sent to the originating point in conference circuits.

Connected to each input El to En is a multiplier ML which is controlled by the control device MS, which receives its control signals from the respective subscriber point in the manner already described, for individual volume control of the audio signal. The audio signals at the outputs of the multipliers ML are added by the adder AD and sent to another multiplier MP. While the multiplier ML was used for individual adjustment of the volume of the audio signals to the separate participants in the conference, the multiplier MP can be used to adjust the volume of the audio signal transmitted to the respective subscriber point. Connected to the output of the multiplier MP is an audio coder AC which converts the linear PCM audio signals into companded PCM audio signals for transmission on the one utility channel to the subscriber point.

If the bandwidth of the subscriber point connecting line allows it, it is also possible to transfer the video signal at a higher data rate. In addition, devices can be provided in the shared processing installation GV (see FIG. 1) which convert the image spot data of an image memory BS (see FIGS. 4 or 5) in such a way that they can be transferred as facsimile data to one or more subscriber points over a utility channel. One prerequisite is that the subscriber point in question must have a facsimile machine. A transfer of this type can once again be initiated, for example, by means of symbolic representations, as already described. It is also possible to use a suitable device in the shared processing installation GV to convert the data for a document acquired by a television camera, located in an image memory BS, into the ASCII code corresponding to the letters, numbers and symbols, and then to send this information over a utility channel to one or more subscriber points, at each of which a corresponding printer must be present to reproduce it. This type of information processing and transfer is of interest especially when documents are introduced into the video conference, so that participants can be sent hard copies of the information.

Because of its independent structure, the shared processing installation GV can be connected to any digital telecommunications switching system that has subscriber lines with the characteristics described. Telecommunications switching systems of this kind can therefore not only be retrofitted, but can also be easily equipped with additional performance features. The shared processing installation GV—several of which, as already mentioned, can also be present—can also constitute a component of the control device ST of the telecommunications switching system (see FIG. 1).

We claim:

1. A video conference installation for a plurality of subscriber points, each subscriber point having transmission and reception devices for audio signals and video signals, the subscriber points having access to a shared processing installation operable to transmit audio signals and video signals to and from the subscriber points, the processing installation having individual subscriber units which are permanently assignable at the beginning of a conference for a duration of the conference, to any respective subscriber point participating in the conference, each individual subscriber unit having an image memory and reading and writing devices communicating with the image memory such that a full frame of the video signals is available to the installation, multiplexers allowing optional access to video signals of all the subscriber points, and means for processing the audio signals and the video signals for transmission to the individual subscriber points based upon control signals from the individual subscriber units, said installation comprising:

a digital communication system and a plurality of connection channels connecting the shared processing installation to the digital communication system, each of a plurality of telephone sets being connectable to the digital communication system via a subscriber circuit having two identical utility channels and one data signalling channel for transmission of information in each direction over each of the subject subscriber circuits, audio signals transmitted to and from the telephone sets during the conference being transmitted in pulse code modulated words on one said utility channel, and compressed video signals for at least one of a television camera and a video monitor being transmitted over the other said utility channel;

each of said subscriber points having input means including at least one of an input keyboard, a light pen and means for producing data indicating a digital position on the screen as selected by a user, symbols being displayed on the screen from data representing the symbols produced by an overlay generator in the individual subscriber unit and added to the video signal, while control and positioning signals from the subscriber point are produced as a function of operation of the input means and are transferred over the signalling channel to initiate control and switching actions for the respective said subscriber point.

2. The video conference installation according to claim 1, wherein the symbols are displayed at least at one edge of the screen of the video monitor.

3. The video conference installation according to claim 1, wherein in case of a conference with more than one additional participant, video information acquired by the television camera of other said subscriber points participating in the conference is displayed on a respective video monitor of a subscriber point, in which the video signals arriving from the other subscriber points are processed in the shared processing installation in order to assemble video data to be displayed on the screen.

4. The video conference installation according to claim 1, comprising individual image memories in each of the individual subscriber units for conference participants, the individual image memories being operable for intermediate storage of video signals from the television camera of the respective subscriber point participating in the conference, outputs of the image memories being connected to a memory multiplexer whose output signal is sent to the subscriber point as the video signal.

5. The video conference installation according to claim 4, further comprising one horizontal filter and one vertical filter, interposed between a respective output of the image memory and an input of the memory multiplexer, with these filters determining at least one of position and reproduction scale of the image on the screen of the video monitor, under influence of a control device.

6. The video conference installation according to claim 1, wherein the subscriber line circuit is provided as an interface to the telecommunications switching system, and further comprising, connected to this subscriber line circuit, a video decoder in a receiving direction and a video coder in a transmitting direction, with the video decoder decompressing and the video coder compressing the video signals.

7. The video conference installation according to claim 6, wherein connected to the subscriber line circuit is a high level data link controller, which controls reception and transmission of data on the signalling channel, and which is connected to the control device.

8. The video conference installation according to claim 1, further comprising a second multiplexer, to which an output of the memory multiplexer, the overlay generator and a cursor generator are connected, the output of the second multiplexer being connected to the video coder.

9. The video conference installation according to claim 7, wherein the HDLC controller is connected to a control signal decoder and a position decoder, with the position decoder converting a position signal transmitted over the signaling channel into an X-value and a Y-value, these values being sent to a first comparator, which performs a comparison with output signals of a first address generator driven synchronously with a frame rate of the installation, and generates a control signal for a second address generator when they are identical, and that the second address generator driven synchronously with the frame rate triggers the cursor generator.

10. The video conference installation according to claim 9, wherein the control signal generated by the first comparator releases a second comparator, which compares the output signal of the control signal decoder, with the output signal of the overlay generator, and that when they are identical, a signal for the control device is generated by the second comparator, with a selected function being characterized by said signal.

11. The video conference installation according to claim 9, wherein the image memory has two image spot memories, with one of the image spot memories being operable to read out current frame data and the other image spot memory being operable to write next-frame data, and the image spot memories being triggered by a third address generator driven synchronously with the frame rate.

12. The video conference installation according to claim 11, wherein the third address generator has a read address generator and a write address generator, such that the two generators can be alternatively connected to both image spot memories.

13. The video conference installation according to claim 9, wherein all of the address generators are coupled to one synchronization line, synchronization signals on the synchronization line being generated by one clock shared by all of the individual subscriber units.

14. The video conference installation according to claim 1, wherein connected to the subscriber line circuit is an audio signal decoder in a receiving direction and an audio signal coder in a transmission direction, with the audio signal decoder decompanding and the audio signal coder companding the pulse code modulated audio signals.

15. The video conference installation according to claim 1, wherein the output signal of the audio signal decoder is in each case sent to the other individual subscriber units, and further comprising a multiplier connected to an adder, an output signal of which is sent to the audio signal coder through an additional multiplier, with said multipliers acting to adjust a volume of the audio signals by means of the control device.

16. The video conference installation according to claim 1, wherein the control signals at the subscriber point are generated by manually touching the symbols on the screen of the video monitor.

17. The video conference installation according to claim 1, wherein the control signals at the respective subscriber point are generated by means of a selection of function options made by entering numbers identifying the function options, with screen information used to represent the function options being located in the overlay generator, and the identifying numbers being evaluated in the control device based on the particular function option.

18. The video conference installation according to claim 1, wherein the individual subscriber unit has an additional image memory used to acquire screen data processed appropriately for reproduction on a facsimile machine, which data are transferred to a subscriber point over the utility channel.

19. The video conference installation according to claim 18, wherein when facsimile data in the individual subscriber unit are purely text data, said data are converted into corresponding ASCII characters, which are transferred over a utility channel to a subscriber point.

20. The video conference installation according to claim 1, wherein general symbols concerning the subscriber point, and symbols concerning the other subscriber points, are displayed on the screen of the video monitor.

21. The video conference installation for a telecommunications switching system with a control device according to claim 1, wherein the shared processing installation forms a part of the control arrangement.

* * * * *